US010003641B2

(12) United States Patent
Sahin et al.

(10) Patent No.: US 10,003,641 B2
(45) Date of Patent: Jun. 19, 2018

(54) METHOD AND SYSTEM OF SESSION-AWARE LOAD BALANCING

(71) Applicant: Telefonaktiebolaget L M Ericsson (publ), Stockholm (SE)

(72) Inventors: Serdar Sahin, Plano, TX (US); Qiwen Zhang, Plano, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 245 days.

(21) Appl. No.: 14/488,085

(22) Filed: Sep. 16, 2014

(65) Prior Publication Data
US 2016/0080505 A1 Mar. 17, 2016

(51) Int. Cl.
G06F 15/16 (2006.01)
H04L 29/08 (2006.01)

(52) U.S. Cl.
CPC ...... H04L 67/1027 (2013.01); H04L 67/1002 (2013.01); H04L 67/1034 (2013.01)

(58) Field of Classification Search
CPC ............... H04L 67/148; H04L 67/1027; H04L 67/1034; H04L 67/1002
See application file for complete search history.

(56) References Cited

U.S. PATENT DOCUMENTS

| 7,328,237 | B1 * | 2/2008 | Thubert | ............ | H04L 29/12783 |
| | | | | | 370/392 |
| 2004/0024881 | A1 | 2/2004 | Elving et al. | | |
| 2004/0268357 | A1 * | 12/2004 | Joy | ......... | H04L 29/06 |
| | | | | | 718/105 |
| 2006/0209688 | A1 * | 9/2006 | Tsuge | ...... | H04L 45/00 |
| | | | | | 370/229 |
| 2009/0271515 | A1 | 10/2009 | Iyengar et al. | | |
| 2011/0145420 | A1 * | 6/2011 | Kakadia | ................ | G06F 9/5083 |
| | | | | | 709/228 |

(Continued)

FOREIGN PATENT DOCUMENTS

WO 2013/164777 A1 11/2013

OTHER PUBLICATIONS

SDN controller (software-defined networking controller), Nov. 6, 2012, TechTarget, http://searchsdh.techtarget.com/definition/SDN-controller-software-defined-networking-controller.*

(Continued)

Primary Examiner — John M Macilwinen
(74) Attorney, Agent, or Firm — Nicholson De Vos Webster & Elliott LLP

(57) ABSTRACT

Methods implemented in a network device are disclosed for maintaining session integrity through load balancing. The method assigns a same virtual Internet protocol VIPA to the network device and a set of servers. The network device is assigned a set of next hop IP addresses, where each next hop IP address corresponds to a route to a server, and the VIPA of the network device is advertised to outside of the load balancing system. When a packet is a first packet from a source of a communication session and destined to the VIPA, the network device selects a next hop IP address to forward to a server according to its load balancing policy. The selection is saved so that subsequent packets of the same communication session from the same source will be forwarded to the same server.

20 Claims, 11 Drawing Sheets

(56) References Cited

U.S. PATENT DOCUMENTS

| | | | | |
|---|---|---|---|---|
| 2012/0297491 A1* | 11/2012 | Schory | .............. | H04L 29/12481 726/26 |
| 2013/0174177 A1* | 7/2013 | Newton | .............. | H04L 67/1008 718/105 |
| 2013/0268646 A1* | 10/2013 | Doron | ................. | H04L 67/1002 709/223 |
| 2015/0092551 A1* | 4/2015 | Moisand | .............. | H04L 12/4633 370/235 |

OTHER PUBLICATIONS

"IPsec", 10 pages, Wikipedia, The Free Encyclopedia, downloaded from http://en.wikipedia.org/wiki/IPsec on Aug. 29, 2014.

"Load balancing (computing)," 7 pages, Wikipedia, The Free Encyclopedia, downloaded from http://en.wikipedia.org/wiki/Load_balancing_(computing) on Aug. 27, 2014.

S. Kent, "IP Encapsulating Security Payload (ESP)," Dec. 2005, 41 pages, Network Working Group, Request for Comments: 4303., The Internet Society.

J. Postel, "User Datagram Protocol," Aug. 28, 1980, 3 pages, RFC: 768.

"Transmission Control Protocol, DARPA Internet Program Protocol Specification," Sep. 1981, 91 pages, RFC: 793, Information Sciences Institute, University of Southern California, Marina del Rey, California.

C. Hedrick, "Routing Information Protocol," Jun. 1988, 33 pages, Network Working Group, Request for Comments: 1058.

David Oran, "OSI IS-IS Intra-domain Routing Protocol," Feb. 1990, 157 pages, Network Working Group, Request for Comments: 1142.

T. Socolofsky, et al., "A TCP/IP Tutorial," Jan. 1991, 28 pages, Network Working Group, Request for Comments: 1180.

G. Malkin, et al., "RIPng for IPv6," Jan. 1997, 19 pages, Network Working Group, Request for Comments: 2080.

R. Braden, et al., "Resource ReSerVation Protocol (RSVP)—Version 1 Functional Specification," Sep. 1997, 112 pages, Network Working Group, Request for Comments: 2205.

J. Wroclawski, "The Use of RSVP with IETF Integrated Services," Sep. 1997, 33 pages, Network Working Group, Request for Comments: 2210.

J. Wroclawski, "Specification of the Controlled-Load Network Element Service," Sep. 1997, 19 pages, Network Working Group, Request for Comments: 2211.

S. Shenker, et al., "Specification of Guaranteed Quality of Service," Sep. 1997, 20 pages, Network Working Group, Request for Comments: 2212.

J. Moy, "OSPF Version 2," Apr. 1998, 244 pages, Network Working Group, Request for Comments: 2328, The Internet Society.

G. Malkin, "RIP Version 2," Nov. 1998, 39 pages, Network Working Group, Request for Comments: 2453, The Internet Society.

S. Deering, et al., "Internet Protocol, Version 6 (IPv6) Specification," Dec. 1998, 39 pages, Network Working Group, Request for Comments: 2460, The Internet Society.

K. Nichols, et al., "Definition of the Differentiated Services Field (DS Field) in the IPv4 and IPv6 Headers," Dec. 1998, 20 pages, Network Working Group, Request for Comments: 2474, The Internet Society.

S. Blake, et al., "An Architecture for Differentiated Services," Dec. 1998, 36 pages, Network Working Group, Request for Comments: 2475, The Internet Society.

J. Heinanen, et al., "Assured Forwarding PHB Group," Jun. 1999, 11 pages, Network Working Group, Request for Comments: 2597, The Internet Society.

D. Borman, et al., "IPv6 Jumbograms," Aug. 1999, 9 pages, Network Working Group, Request for Comments: 2675, The Internet Society.

D. Black, "Differentiated Services and Tunnels," Oct. 2000, 14 pages, Network Working Group, Request for Comments: 2983, The Internet Society.

K. Nichols, et al., "Definition of Differentiated Services Per Domain Behaviors and Rules for their Specification," Apr. 2001, 24 pages, Network Working Group, Request for Comments: 3086, The Internet Society.

D. Black, et al., "Per Hop Behavior Identification Codes," Jun. 2001, 8 pages, Network Working Group, Request for Comments: 3140, The Internet Society.

D. Awduche, et al., "RSVP-TE: Extensions to RSVP for LSP Tunnels," Dec. 2001, 61 Pages, Network Working Group, Request for Comments: 3209, The Internet Society.

B. Davie, et al., "An Expedited Forwarding PHB (Per-Hop Behavior)," Mar. 2002, 16 pages, Network Working Group, Request for Comments: 3246, The Internet Society.

A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.

D. Grossman, "New Terminology and Clarifications for Diffserv," Apr. 2002, 10 pages, Network Working Group, Request for Comments: 3260, The Internet Society.

F. Baker, et al., "Management Information Base for the Differentiated Services Architecture," May 2002, 116 pages, Network Working Group, Request for Comments: 3289, The Internet Society.

Y. Bernet, et al., "An Informal Management Model for Diffsery Routers," May 2002, 56 pages, Network Working Group, Request for Comments: 3290, The Internet Society.

K. Chan, et al., "Differentiated Services Quality of Service Policy Information Base," Mar. 2003, 96 pages, Network Working Group, Request for Comments: 3317, The Internet Society.

L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.

K. Kompella, et al., "Procedures for Modifying the Resource reSerVation Protocol (RSVP)," Oct. 2004, 7 pages, Network Working Group, Request for Comments: 3936, The Internet Society.

B. Fenner, et al., "Management Information Base for the User Datagram Protocol (UDP)," Jun. 2005, 19 pages, Network Working Group, Request for Comments: 4113, The Internet Society.

Y. Rekhter, et al., "A Border Gateway Protocol 4 (BGP-4)," Jan. 2006, 104 pages, Network Working Group, Request for Comments: 4271, The Internet Society.

S. Kent, et al., "Security Architecture for the Internet Protocol," Dec. 2005, 101 pages, Network Working Group, Request for Comments: 4301, The Internet Society.

R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

E. Rosen, et al., "BGP/MPLS IP Virtual Private Networks (VPNs)," Feb. 2006, 47 pages, Network Working Group, Request for Comments: 4364, The Internet Society.

J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.

Z. Ali, et al., "Node-ID Based Resource Reservation Protocol (RSVP) Hello: A Clarification Statement," Jun. 2006, 7 pages, Network Working Group, Request for Comments: 4558, The Internet Society.

J. Babiarz, et al., "Configuration Guidelines for DiffSery Service Classes," Aug. 2006, 57 pages, Network Working Group, Request for Comments: 4594, The Internet Society.

K. Kompella, et al., "Virtual Private LAN Service (VPLS) Using BGP for Auto-Discovery and Signaling," Jan. 2007, 28 pages, Network Working Group, Request for Comments: 4761, The IETF Trust.

M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.

(56) References Cited

OTHER PUBLICATIONS

L. Andersson, et al., "LDP Specification," Oct. 2007, 135 pages, Network Working Group, Request for Comments: 5036, The IETF Trust.

R. Coltun, et al., "OSPF for IPv6," Jul. 2008, 94 pages, Network Working Group, Request for Comments: 5340, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic", May 2010, 14 pages, Internet Engineering Task Force (IETF), Request for Comments: 5865, IETF Trust and the persons identified as the document authors.

Admitted Traffic, May 2010, 14 pages, Internet Engineering Task Force (IEFT), Request for Comments: 5865, IETF Trust and the persons identified as the document authors.

\* cited by examiner

METHOD AND SYSTEM OF SESSION-AWARE LOAD BALANCING

FIELD OF INVENTION

The embodiments of the invention are related to the field of networking. More specifically, the embodiments of the invention relate to a method and system to performing load balancing while maintaining session integrity.

BACKGROUND

Load balancing is a computer networking method for distributing workloads across multiple computing resources, such as computers, a computer cluster, network links, central processing units or disk drives. Load balancing aims to optimize resource use, maximize throughput, minimize response time, and avoid overload of any one of the resources. Using multiple components with load balancing instead of a single component may increase reliability through redundancy. Thus, load balancing is widely used to enhance scalability and availability of a telecommunication and information technology (IT) applications.

In a typical load balancing implementation, a load balancer, generally implemented in a network device (thus referred to as a load balancing network device), is coupled to a number of servers (sometimes referred to as backend servers) that process packets transmitted from clients. The load balancer applies a load balancing policy to determine to which server the packets are to be sent.

Generally the load balancer applies the load balancing policy on per-packet basis. Yet, some telecommunication and IT applications offer session based services, where packets belonging to the same session can't be handled by different servers. In some of the applications, the source and destination addresses of the packets can't be altered in the packet forwarding through the load balancer. It is a challenging to accommodate these application in load balancing.

SUMMARY

A method of session-aware load balancing implemented in a network device serving as a load balancing network device coupled to a network containing a load balancing system is disclosed. The load balancing system contains the network device and a plurality of servers. The method comprises assigning a virtual Internet Protocol address (VIPA) to the network device, where the VIPA is shared with the plurality of servers. The method continues with assigning a set of next hop IP addresses in the network device and advertising the VIPA of the network device to network elements outside of the load balancing system, where each next hop IP address corresponds to a route to one of the plurality of servers. The method continues with receiving a packet with a destination IP address corresponds to the VIPA shared by the network device and the plurality of servers, and determining that the packet with a source IP address is a first packet in a communication session with the source IP address. Then the method continues with selecting one of the set of next hop IP addresses to forward the packet to reach a server of the plurality of servers based on a load balancing policy in response to the determination that the packet with the source IP address is the first packet in the communication session with the source IP address, and forwarding the packet to the selected next hop IP address, and saving the selection of the network device for forwarding subsequent packets of the communication session with the destination IP address.

A network device of session-aware load balancing coupled to a load balancing system is disclosed. The network device is to balance load of the load balancing system and is coupled to a plurality of servers. The network device comprises a processor and a non-transitory machine readable storage media coupled to the processor and storing load balancing software, which when executed by the processor, causes the processor to: assign a virtual Internet Protocol address (VIPA) to the network device, where the VIPA is shared with the plurality of servers; assign a set of next hop IP addresses in the network device, where each next hop IP address corresponds to a route to one of the plurality of servers; advertise the VIPA of the network device to network elements outside of the load balancing system; receive a packet with a destination IP address corresponds to the VIPA shared by the network device and the plurality of servers; determine that the packet with a source IP address is a first packet in a communication session with the source IP address; select one of the set of next hop IP addresses to forward the packet to reach a server of the plurality of servers based on a load balancing policy in response to the determination that the packet with the source IP address is the first packet in the communication session with the source IP address; forward the packet to the selected next hop IP address; and save the selection of the network device for forwarding subsequent packets of the communication session with the destination IP address.

A non-transitory machine-readable medium having instructions stored therein for session-aware load balancing is disclosed. The instructions, when executed by a processor, cause the processor to perform operations at a network device coupled to a load balancing system, where the network device is to balance load of the load balancing system and is coupled to a plurality of servers. The operations include assigning a virtual Internet Protocol address (VIPA) to the network device, where the VIPA is shared with the plurality of servers. The operations include assigning a set of next hop IP addresses in the network device and advertising the VIPA of the network device to network elements outside of the load balancing system, where each next hop IP address corresponds to a route to one of the plurality of servers. The operations continue with receiving a packet with a destination IP address corresponds to the VIPA shared by the network device and the plurality of servers, and determining that the packet with a source IP address is a first packet in a communication session with the source IP address. Then the operations continue with selecting one of the set of next hop IP addresses to forward the packet to reach a server of the plurality of servers based on a load balancing policy in response to the determination that the packet with the source IP address is the first packet in the communication session with the source IP address, and forwarding the packet to the selected next hop IP address, and saving the selection of the network device for forwarding subsequent packets of the communication session with the destination IP address.

Embodiments of the invention provide ways for a load balancer to forward packets belong to the same communication session to the same server thus maintaining session integrity throughout load balancing.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
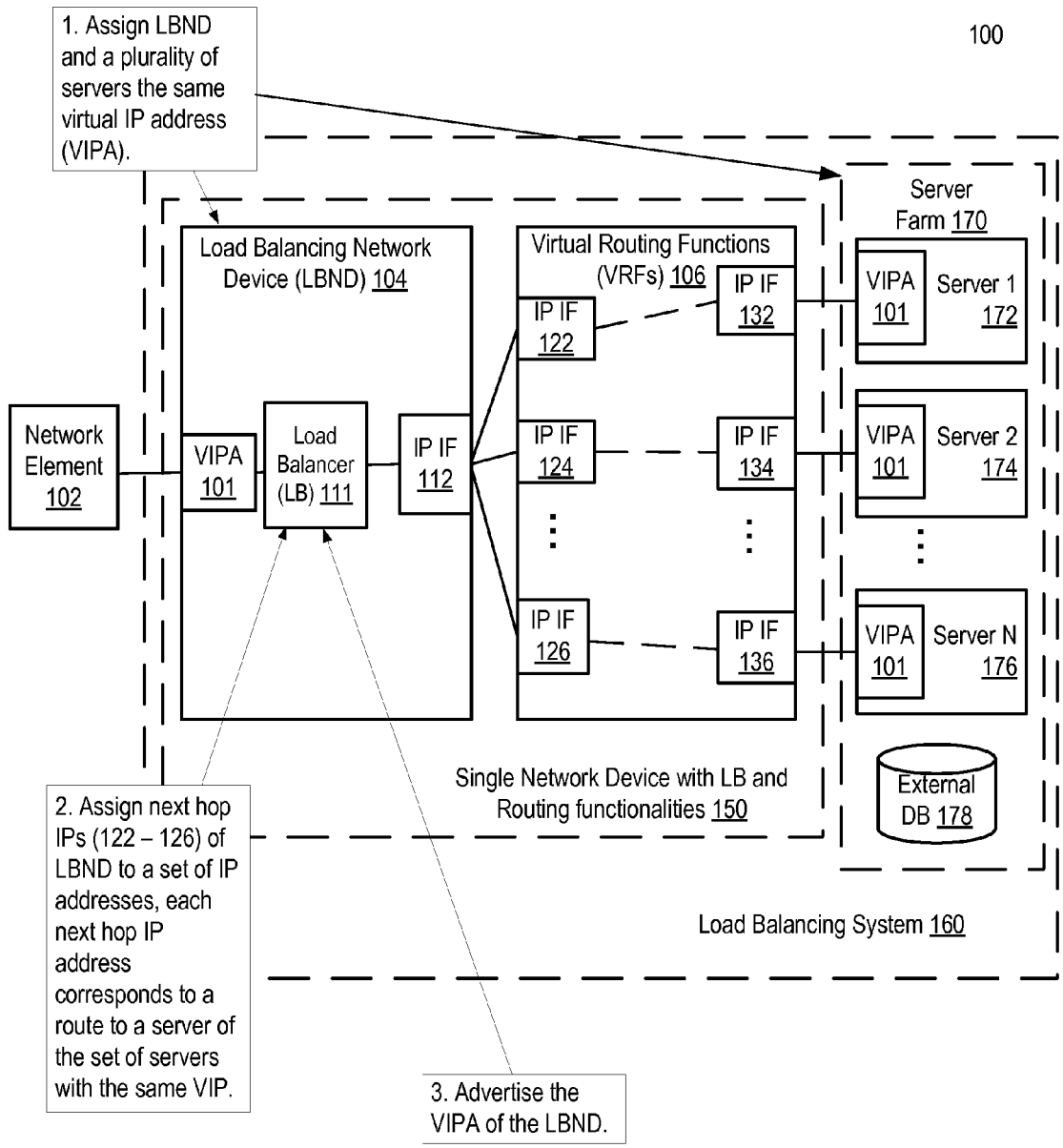
FIG. 1 is a block diagram illustrating provisioning of a session-aware load balancing system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Architecture and Operations of a Session-Aware Load Balancing System

In a typical load balancing system, the load balancer presents a virtual IP address towards the client side, and it is configured with a server pool containing the IP addresses of the servers. The load balancer receives packets and examines the packet header (e.g., the source and destination addresses). The load balancer often modifies the packet's source and/or destination address (sometimes other header information), and forwards the packet to one of the servers. The forwarding decision is generally made on per packet basis.

Yet some telecommunication and IT applications offer session based services, where packets belonging to the same session needs to be handled by the same server. For example, Internet Protocol Security (IPSec) is a protocol suite for securing Internet Protocol (IP) communications by authenticating and encrypting each IP packet of a communication session. It includes protocols for establishing mutual authentication between agents at the beginning of the session and negotiation of cryptographic keys to be used during the session.

Authentication and encryption are two main parts of IPSec. With regard to applying load balancing, the challenges for IPSec include:

With authentication, the load balancer is not allowed to change the source and destination IP address of an IP packet, otherwise it will break the integrity of IP packet.

With encryption, the load balancer is not aware of the payload in the IP packet.

IPSec are used in many applications, a well-known example is VoLTE (Voice over Long-Term Evolution) P-CSCF (Proxy Call Section Control Function) where IPSec is used between a VoLTE user equipment (UE) and P-CSCF. In this scenario, the packets belonging to the same registration and call can't be handled by different P-CSCFs, when load balancing is applied and multiple servers performing P-CSCFs concurrently. Thus, while load balancing is often desirable from UEs toward a pool of P-CSCFs where IP packets are transported over IPSec, there is no known solution to achieve this goal.

Embodiments of the invention aim at providing solution for applications like IPSec so that load balancing is aware of a communication session associated with a packet and forward packets belong to the same communication session to the same server where all servers share the same IP address which is also advertised by the Load Balancer to the external entities. In addition, embodiments of the invention enables load balancing to select a backup server for a communication session upon the server serving the communication session fails. In this specification, the terms "communication session" and "session" are used interchangeably.

FIG. 1 is a block diagram illustrating provisioning of a session-aware load balancing system according to one embodiment of the invention. System 100 contains network element 102 and load balancing system 160. Network element 102 is an example of a client of load balancing system 160, which may server hundreds to thousands of network elements.

Load balancing system 160 includes load balancing network device 104, virtual routing functions (VRFs) 106, and server farm 170. Load balancing network device 104 contains load balancer 111 and multiple IP interfaces, which include virtual IP address (VIPA) interface 101 and IP interface 112. Load balancer 111 is a hardware/software module performing load balancing functions within load balancing network device 104 IP interface 112 connects to multiple IP interfaces 122-126 of VRFs 106.

VRFs 106 may be implemented on a network element such as a router or an SDN OpenSwitch. In alternative, a single network device 150 may perform load balancing and routing functionalities of load balancing network device 104 and VRFs 106. Within VRFs, each of IP interfaces 122-126 coupled to IP interface 112 of load balancing network device 104 maps to a server of server farm 170 through a set of IP interfaces 132-136 respectively as illustrated in FIG. 1. Each of the set of IP interfaces 132-136 in turn is coupled to one of the set of servers 172-176 within server farm 170.

Server farm 170 contains the set of servers 172-176 and external database 178. Each server may operate independently processing packets received through its IP interface. Each server includes one VIPA interface. At least some of the servers are coupled to external database 178 thus may read or write data to external database 178. VIPA (sometimes referred to as VIP) is known in the art, and it is an IP address assigned to multiple domain names and/or network devices that share an IP address. Utilizing VIPA, the multiple domain names and/or network devices may share the load of processing packets destined to the same IP address.

Task boxes 1 to 3 illustrate the order in which operations are performed according to one embodiment of the invention. At task box 1, the load balancing network device 104 and a plurality of servers in server farm 170 are assigned to the same virtual IP address (VIPA). That is, VIPA 101 corresponds to the same address for load balancing network device 104 and servers 1-N as illustrated.

At task box 2, load balancer 111 assigns a set of next hop IP addresses where each next hop IP address corresponds to a route to a server in server farm 170. A next hop is the next closest port of a network element that a packet will be forwarded to. The next hop IP address is an IP address of the next closest port. As illustrated, the packets in load balancing network device 104 are forwarded out through IP interface 112, which is coupled to IP interfaces 122-126 of VRFs 106, where each of the IP interfaces 122-126 maps to a server of server farm 170 through a set of IP interfaces 132-136 respectively.

Figure 3:
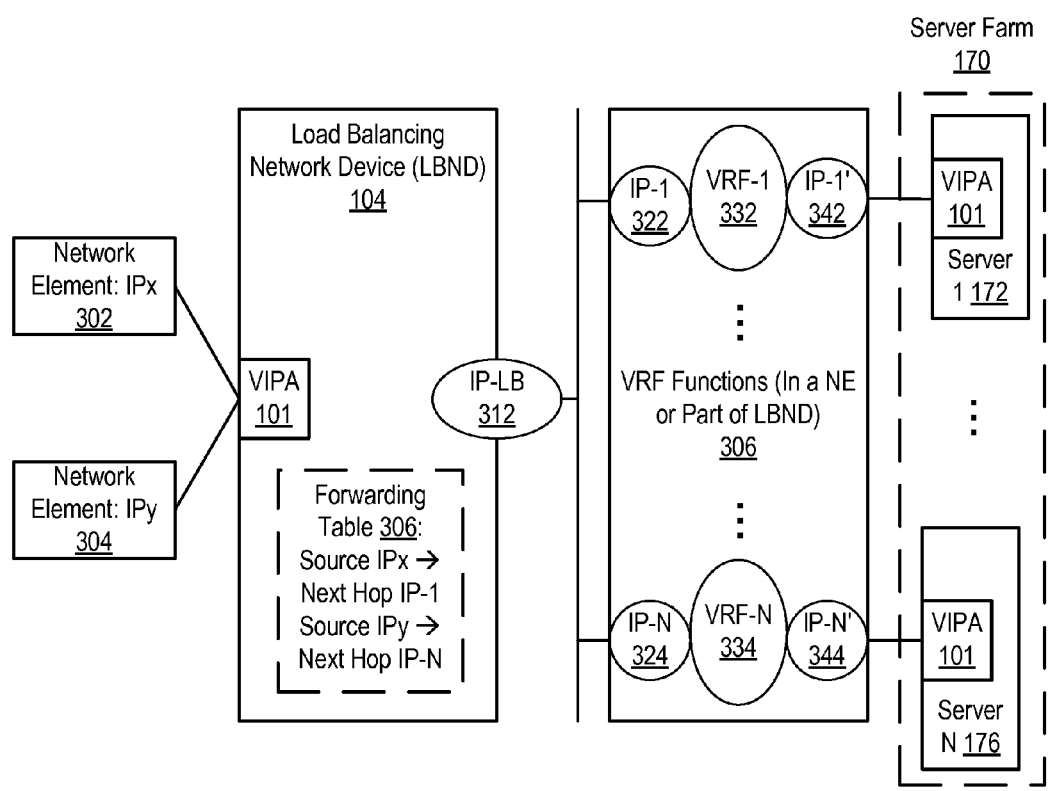
FIG. 3 illustrates IP address allocation according to one embodiment of the invention.

FIG. 3 illustrates IP address allocation according to one embodiment of the invention. FIG. 3 is similar to FIG. 1, and the same or similar references indicate elements or components having the same or similar functionalities. Referring to FIG. 3, two network elements represent a number of network elements coupled to the VIPA 101, which is the same VIPA of servers of server farm 170. The network elements 302-304 have IP addresses of IPx and IPy respectively.

In load balancing network device 104, the next hop is selected. The next hop IP addresses may be stored in a forwarding information base (FIB) or a routing information base (RIB) if load balancing network device 104 performs a traditional routing/forwarding function of a router. The next hop IP addresses may be stored in a forwarding table (often referred to as a flow table too) if load balancing network device 104 performs a coordination function of a software-defined networking (SDN) controller or load balancing network device performs packet forwarding function of a network element of a SDN system. The exemplary forwarding table 306 contains two entries, indicating that packets with source IP address being IPx having the next hop with IP address IP-1, and IPy having the next hop with IP address IP-N.

Packets are forwarded out of load balancing network device 104 through an IP interface with IP address of IP-LB 312. IP-LB 312 is coupled to a set of IP addresses including IP-1 to IP-N at 322 and 324 respectively. IP-LB 312 and the set of IP addresses are in a same subnet in one embodiment. Virtual routing functions (VRFs) 306 may be implemented in a network element or it may be implemented as a part of load balancing network device 104. VRFs may contain N virtual routing functions (VRF-1 to VRF-N), where N is the number of servers within sever farm 170. For each VRF-n, one IP interface is coupled to IP-LB 312, and another IP interface is coupled to a server of server farmer 170. Each VRF-n performs the function of routing IP packets: an IP packet received on IP-n from IP-LB 312 is routed to server n via IP-n', and an IP packet received on IP-n' from server-n is routed to IP LB 312 via IP-n. In one embodiment, the coupling is a direct connection.

With this configuration, load balancing network device 104 does not perform an address translation or address altercation of incoming IP packets, the next-hop IP addresses are set to be the next hop IP addresses IP-1 at reference 322 to IP-N at reference 324, through which one of the VRFs (VRF-n) forwards the packets to a server in server farm 170. The packet forwarding is based on the source IP addresses (IPx or IPy in this example), so that a packet from the same IP address in a session may be forwarded to the same server, thus the approach maintains IP flow stickiness based on the source IP address of an IP packet.

Referring back to FIG. 1, load balancing network device 104 advertises its VIPA to network elements outside of load balancing system 160, so that IP packets with the destination IP address will be forwarded toward its VIPA interface 101.

In one embodiment, the configuration of load balancing system may perform the following:
  Configure the same VIPA on load balancing network device and the set of servers (e.g., VIPA=1.1.1.1);
  Configure the load balancer to work on Open Systems Interconnection (OSI) layer 3;
  Disable destination address/port translation for the load balancer thus stops the load balancer from changing the destination IP/port of the packets received from client side (e.g., network elements 102, 302, or 304).
  Configure next-hop IP addresses at the load balancer (e.g., setting the next-hop IP addresses to be IP-1=10.10.10.1, IP-2=10.10.10.2, . . . , IP-N=10.10.10.N).
  Configure the load balancer's load balancing policy. The load balancing policy may be one known in the art, e.g., a type of round robins based on source IP address or random selection. The load balancing policy will also keep the IP packets from the same source IP addresses within a same communication session to be forwarded to the same server as discussed in more details herein below.

Figure 2:
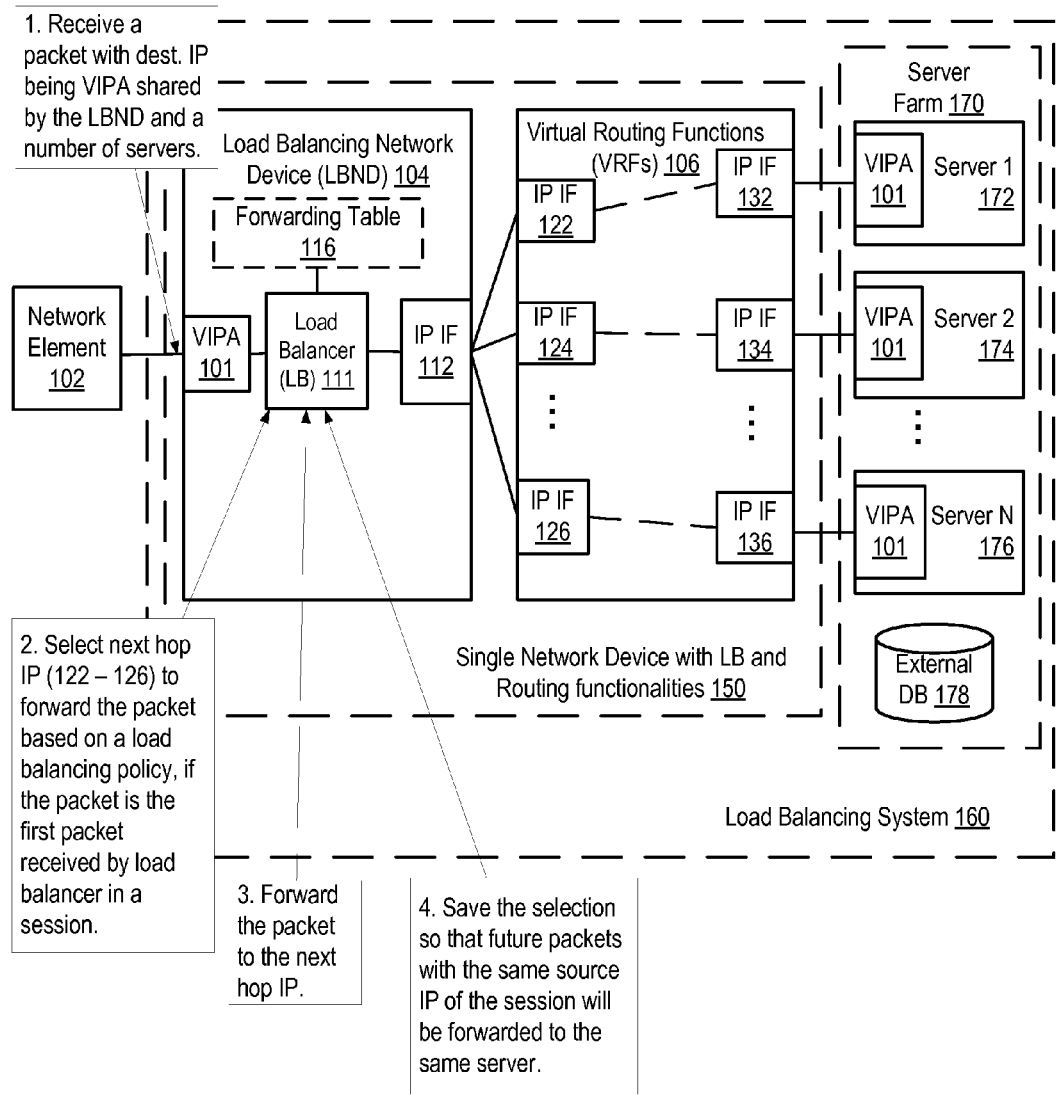
FIG. 2 is a block diagram illustrating operations of a session-aware load balancing system according to one embodiment of the invention.

FIG. 2 is a block diagram illustrating operations of a session-aware load balancing system according to one embodiment of the invention. FIG. 2 is similar to FIG. 1, and the same or similar references indicate elements or components having the same or similar functionalities. Task boxes 1 to 4 of FIG. 2 illustrate the order in which operations are performed according to one embodiment of the invention.

At task box 1, load balancing network device 104 receives a packet with destination IP address being the VIPA shared between load balancing network device 104 and servers 1-N at references 172-176. Because load balancing network device 104 advertises its VIPA to network elements outside of load balancing system 160, packets with the destination IP address being the VIPA are forwarded to load balancing network device 104, instead of the servers 1-N directly.

At task box 2, load balancing network device 104 selects a next hop IP address to forward the packet based on a load balancing policy, if the packet is the first packet received by the load balancer in a communication session. The load balancing policy may be one of the known policies where the packet is processed based header information including at least its source IP address.

If the packet is the first packet of a communication session received by the load balancer, the load balancer forwards the packet to the selected next hop IP at task box 3. The packet will be sent to one of the servers in server farm 170 for processing. Load balancing network device 104 saves the selection so that future packets with the same source IP address of the communication session will be forwarded to the same server. The selection may be saved in forwarding table 116 or some types of data structure/database coupled to load balancing network device 104.

Through the operations, all packets of a common source IP of a common communication session will be forwarded to the same server, where state information of the communication session is preserved and packets will be forwarded across the network without altering its source/destination IP addresses. Once the communication session is terminated (load balancer 111 may determine the termination of communication session by examining packets' headers, notification by network element 102 or server farm 170, or timer expiration), the selection of the next hop IP at task box 3 may be removed to leave space for new communication sessions.

Figure 4:
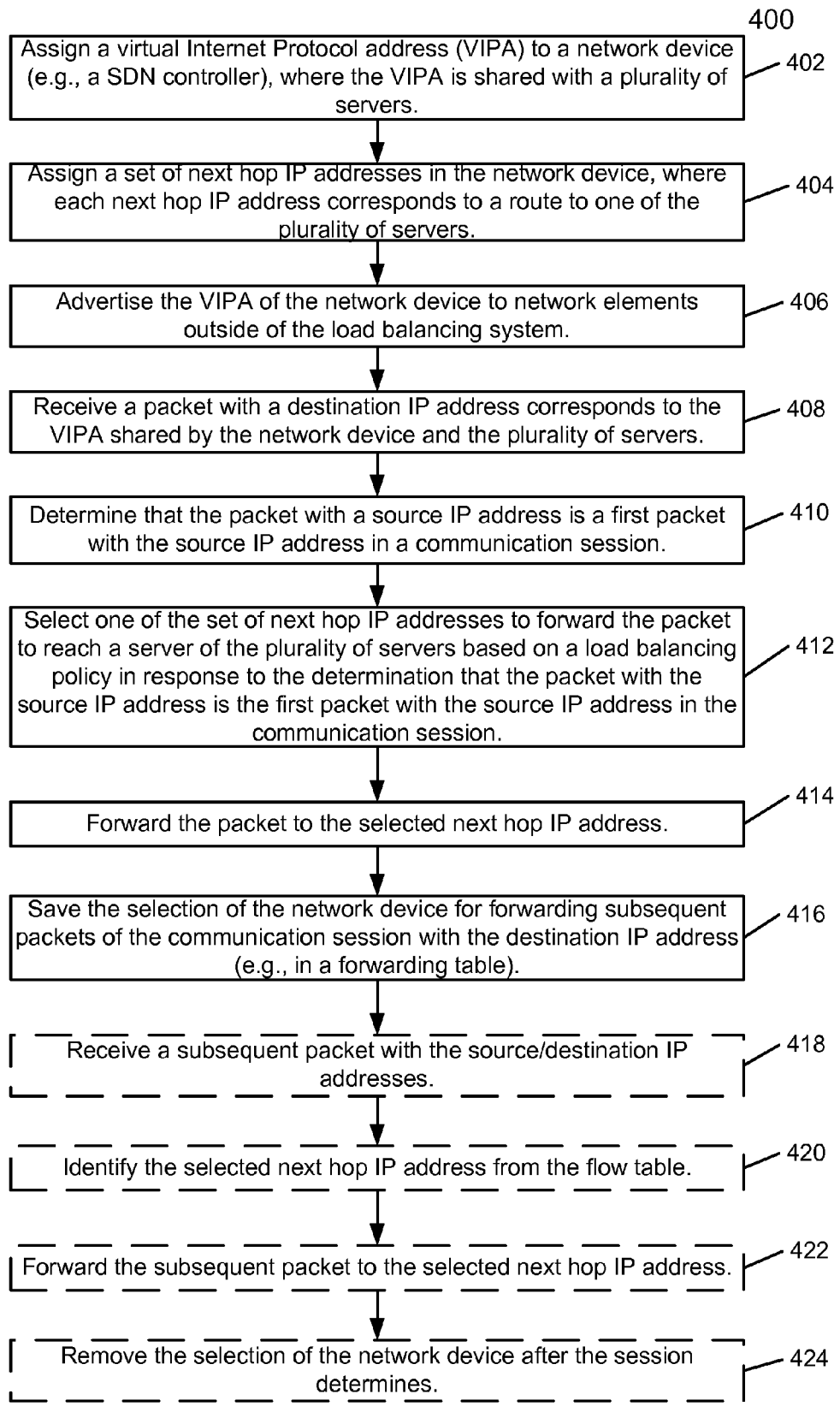
FIG. 4 is a flow diagram illustrating provisioning and operations of a session-aware load balancing system according to one embodiment of the invention.

FIG. 4 is a flow diagram illustrating provisioning and operations of a session-aware load balancing system according to one embodiment of the invention. Method 400 may be implemented in a network device such as load balancing network device 104 of FIGS. 1-3, where the network device coupled to a network containing a load balancing system including the network device and a plurality of servers. The network device may implement a network element with an integrated control and data plane or a network element with separated control and data planes, where in latter case the network element may be a SDN controller or forwarding element.

At reference 402, the network device assigns a VIPA to the network device, where the VIPA is shared with the plurality of servers. The VIPA is provisioned to a network interface of the network device and each of the plurality of servers. At reference 404, the network device assigns a set of next hop IP address in the network device, where each next hop IP address corresponds to a route to one of the plurality of servers. Then at reference 406, the network device advertises the VIPA of the network device to network elements outside of the load balancing system.

Note that in one embodiment, the route to the one of the plurality of server passes a network element performing virtual routing and forwarding function. The network element contains one or more interfaces coupled to the network device and a plurality of interfaces, each coupled to one of the plurality of servers.

At reference 408, the network device receives a packet with destination IP address corresponds to the VIPA shared by the network device and the plurality of servers. It determines at reference 410 that the packet with a source IP address is the first packet in a communication session with the source IP address. Then the network device selects at reference 412 one of the set of next hop IP address to forward the packet to reach a server of the plurality of the servers based on a load balancing policy in response to the determination that the packet with the source IP address is the first packet in the communication session with the source IP address. The load balancing policy may be based on one type of round-robin selection algorithms, random selection, or others.

At reference 414, the network device forwards the packet to the selected next hop IP address, so that packet will be forwarded toward the server based on the load balancing policy. At reference 416, the network device saves the selection for forwarding subsequent packets of the communication session with the destination IP address. In one embodiment, the selection is saved in a forwarding table coupled to the network device. Note the operations at references 414 and 416 may be performed concurrently or the operations at reference 416 are performed earlier than the operations at reference 414 in some embodiments.

Optionally at reference 418, the network device receives a subsequent packet of the communication session with the source and destination IP addresses. The network device identifies at reference 420 the selected next hop IP address from the forwarding table. Then at reference 422, it forwards the subsequent packet to the selected next hop IP address.

Also optionally at reference 424, the network device removes the selection of the network device once the communication session is terminated. The removal saves storage space for load balancing and facilitates saving of selection for a new communication session later.

Through method 400, the network device performs load balancing for packets without altering the source or destination IP addresses of the packets and it maintains session integrity of the packets so that the packets of the same communication session are processed by the same server of the server farm. The method performs well when the same server operates normally, but servers may fail, suffer performance degradation, or enter maintenance phase thus not be able to operate, in those cases the session integrity of the packets may be affected.

Method 400 may apply to many applications where the packets of the applications comply with protocol suites such as IPSec, Diameter, Session Initiation Protocol (SIP), H.248, and Transport Layer Security.

Maintaining Session Integrity Upon Failure

As discussed herein above, a particular server in a server farm does not operate normally in perpetuity. A server may operate abnormally due to failure, performance degradation, or maintenance activities, while packets of a communication session from a particular network element continue arrive at the server for processing. It is desirable to maintain the integrity of the communication session, so the packets can be processed with minimum interruption or delay.

Figure 5:
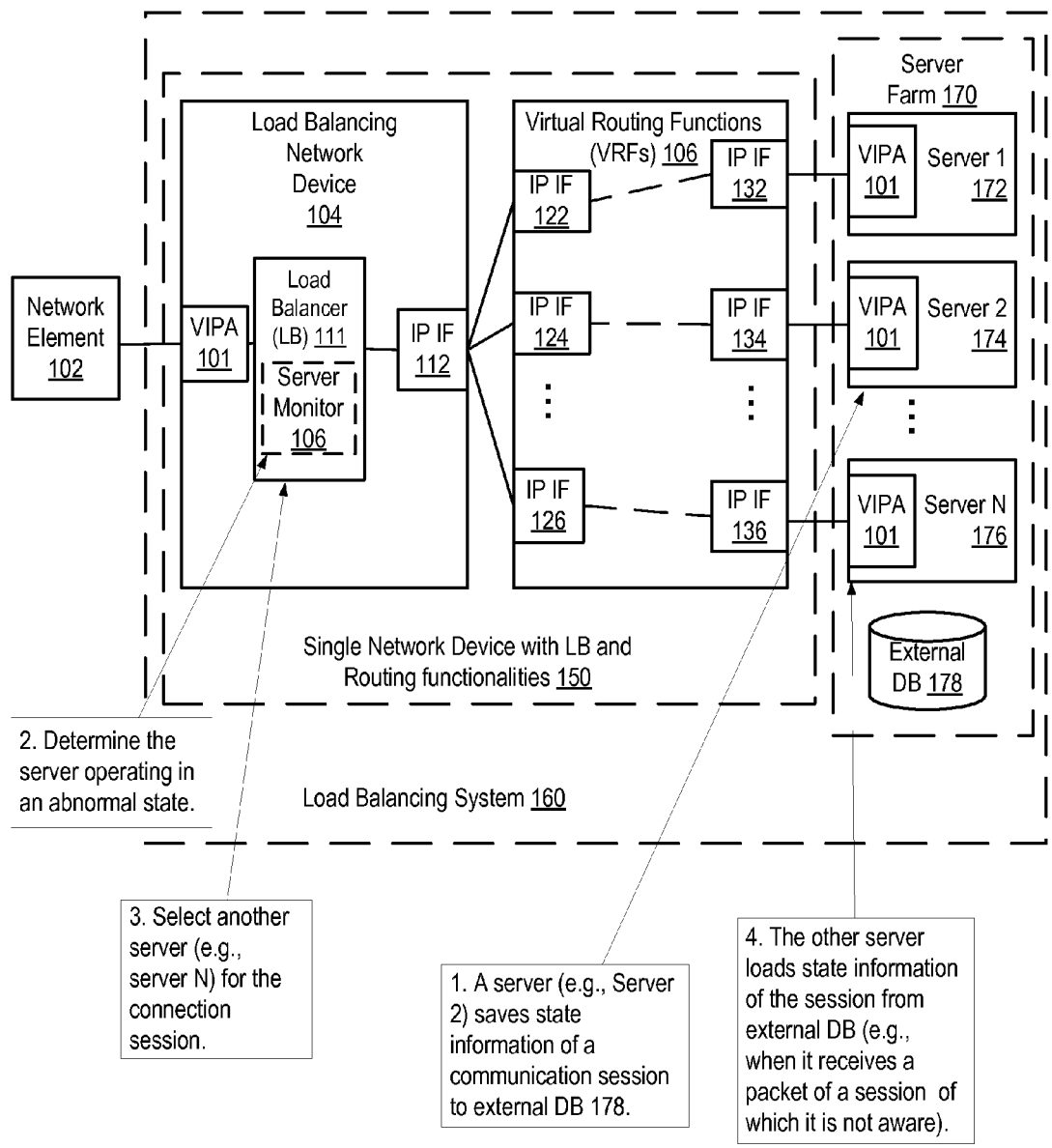
FIG. 5 is a block diagram illustrating session recovery upon server failure according to one embodiment of the invention.

FIG. 5 is a block diagram illustrating session recovery upon server failure according to one embodiment of the invention. FIG. 5 is similar to FIG. 1, and the same or similar references indicate elements or components having the same or similar functionalities. Task boxes 1 to 4 of FIG. 5 illustrate the order in which operations are performed according to one embodiment of the invention.

At task box 1, a server saves state information of a communication session to external database 178. Each server saves the state information of communication sessions processed while it processes packets of the communication sessions. The state information of a communication session may include a registration state of a user associated with the communication session, a user session identifier of the communication session, a dialogue state, and etc. The state information changes during the communication session thus each server keeps external database 178 up to date by updating the database, either periodically or upon occurring of certain events. In one embodiment, external database 178 may poll each server of the state information of communication sessions processed at the servers. External database 178 is accessible to servers of server farm 170, so the servers may write to and read from external database 178.

At task box 2, load balancer 111 determines that a server ("original target server") operates in an abnormal state. Load balancer 111 may make the determination based on information received from polling the servers or notification sent from servers or VRFs 106. The abnormal state may be due to failure, performance degradation, or maintenance activities at the server or problems of the route to the server.

At task box 3, load balancer 111 selects another server for the communication sessions being processed at the server ("backup target server"). The selection may be based on the same load balancing policy as it uses in regular server selection, but it may be based on a different load balancing policy specifically for failure recovery.

At task box 4, the selected other server loads the state information of the communication sessions at the original target server from the external database. In one embodiment, the loading may happen right after the backup target server is selected to process the communication sessions of the original target server. In an alternate embodiment, the loading happens when the backup target server receives a packet of a communication session of which it is not aware of.

After the recovery process, the subsequent packets of the communication sessions associated with the original target server are then forwarded to the backup target server. Since the backup target server has all the state information of the communication sessions, the end-user of the communication session will not be affected by the failure, thus the failure recovery can be interruption-free for the end user of the communication sessions.

Figure 6:
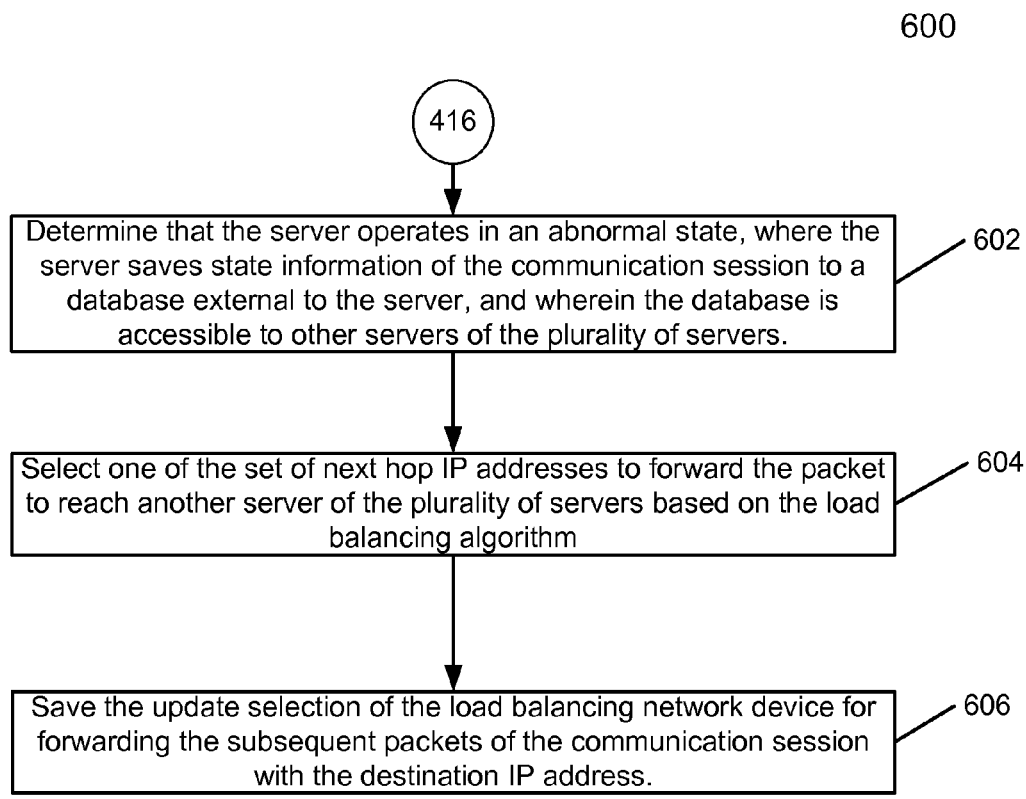
FIG. 6 is a flow diagram illustrating session recovery upon server failure according to one embodiment of the invention.

FIG. 6 is a flow diagram illustrating session recovery upon server failure according to one embodiment of the invention. Method 600 may be implemented in a network device such as load balancing network device 104 of FIGS. 1-3 and FIG. 5, where the network device coupled to a network containing a load balancing system including the network device and a plurality of servers. The network device may implement a network element with an integrated control and data plane or a network element with separated control and data planes, where in latter case the network element may be a SDN controller or forwarding element. Method 600 may be a continuation of method 400 in one embodiment, and it is illustrated as following reference 416. Method 600 may also follow other operations illustrated in FIG. 4, such as reference 422.

At reference 602, the load balancing network device determines that the server associated with a communication session operates in an abnormal state, where the server saves state information of the communication session to a database external to the server, and where the database is accessible to other servers of the plurality of the servers. As discussed herein, the server operating in the abnormal state may be due to problems with the server or the route to the server in the load balancing system, and the load balancing network device does not need to differentiate and/or root-cause the abnormal state. The abnormal state may be determined through the load balancing network device monitoring the server in one embodiment. In an alternative embodiment, the abnormal state may be determined through the server or the network element hosting VRFs notifying the load balancing network device.

At reference 604, the load balancing network device selects one of the set of next hop IP addresses to forward the subsequent packets of the communication session to reach another server of the plurality of servers based on the load balancing policy. Note in one embodiment, the selection of the next hop IP address may be based on a load balancing policy different from the load balancing policy at the initial selection discussed relating to reference 412.

At reference 606, the load balancing network device saves the updated selection for forwarding the subsequent packets of the communication session with the destination IP address.

An Exemplary Implementation of Session-Aware Load Balancing

Figure 7:
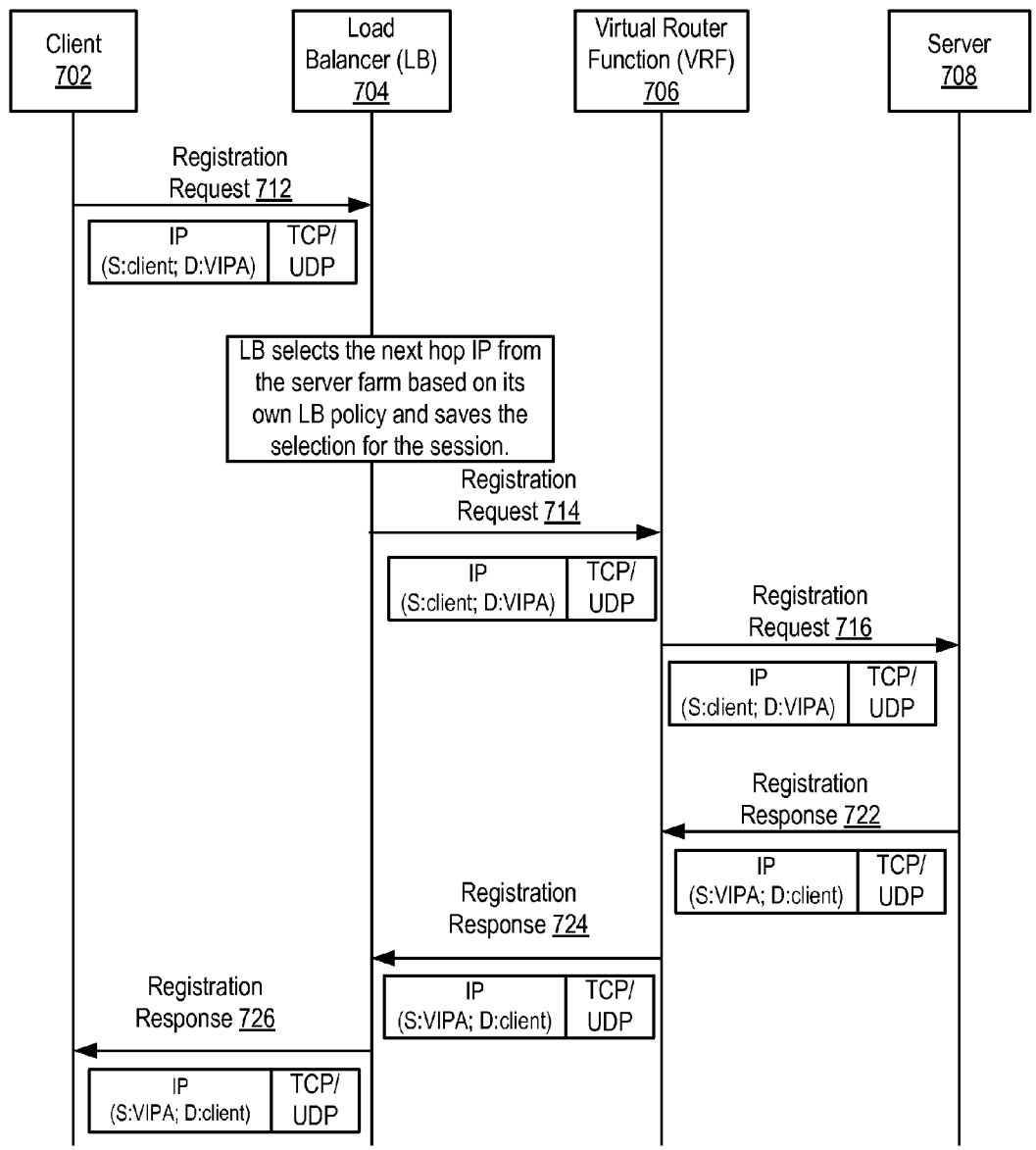
FIG. 7 is a block diagram illustrating the registration operations of session-aware load balancing when packets comply with IPSec according to one embodiment of the invention.

As discussed herein above, methods 400-600 may be implemented for load balancing of packet complying with a number of protocol suites such as IPSec, Diameter, Session Initiation Protocol (SIP), H.248, and Transport Layer Security. FIG. 7 is a block diagram illustrating the registration operations of session-aware load balancing when packets comply with IPSec according to one embodiment of the invention. The operations are performed among client 702 (a network element), load balancer 704 (such as load balancer 111 of FIG. 1), virtual router function (VRF) 706, and server 708. Load balancer 704 and server 708 each contain an IP interface where the IP interfaces have the same virtual IP address (VIPA).

At reference 712, client 702 sends a registration request packet to establish a communication session with the server. The packet contains a layer-4 header of TCP or UDP and a layer 3 IP header, where the layer 3 IP header contains a source IP address of client 702 and destination IP address of the VIPA of load balancer 704 so that the packet is forwarded to the VIPA interface coupled to load balancer 704. At load balancer 704, it selects the next hop IP for a route to a server of the server farm based on its own load balancing policy, and it saves the selection for the communication session. In this example, the selected route is to forward the packet to server 708.

At reference 714, load balancer 704 relays the registration request to VRF 706, which has an IP interface coupled to load balancer 704 and another IP interface coupled to server 708. Then at reference 716, VRF 706 replays the request to server 708, where the registration request is processed. Throughout the process of packet forwarding, the packet maintains the same source and destination IP addresses.

At reference 722, after server 708 finishes the registration process, it sends out a registration response with the header contains the same layer 3 header information. The response gets relayed at VRF 706 and load balancer 704 and return to client 702. Note the registration response may not follow the same route as the registration request in some embodiment.

Figure 8:
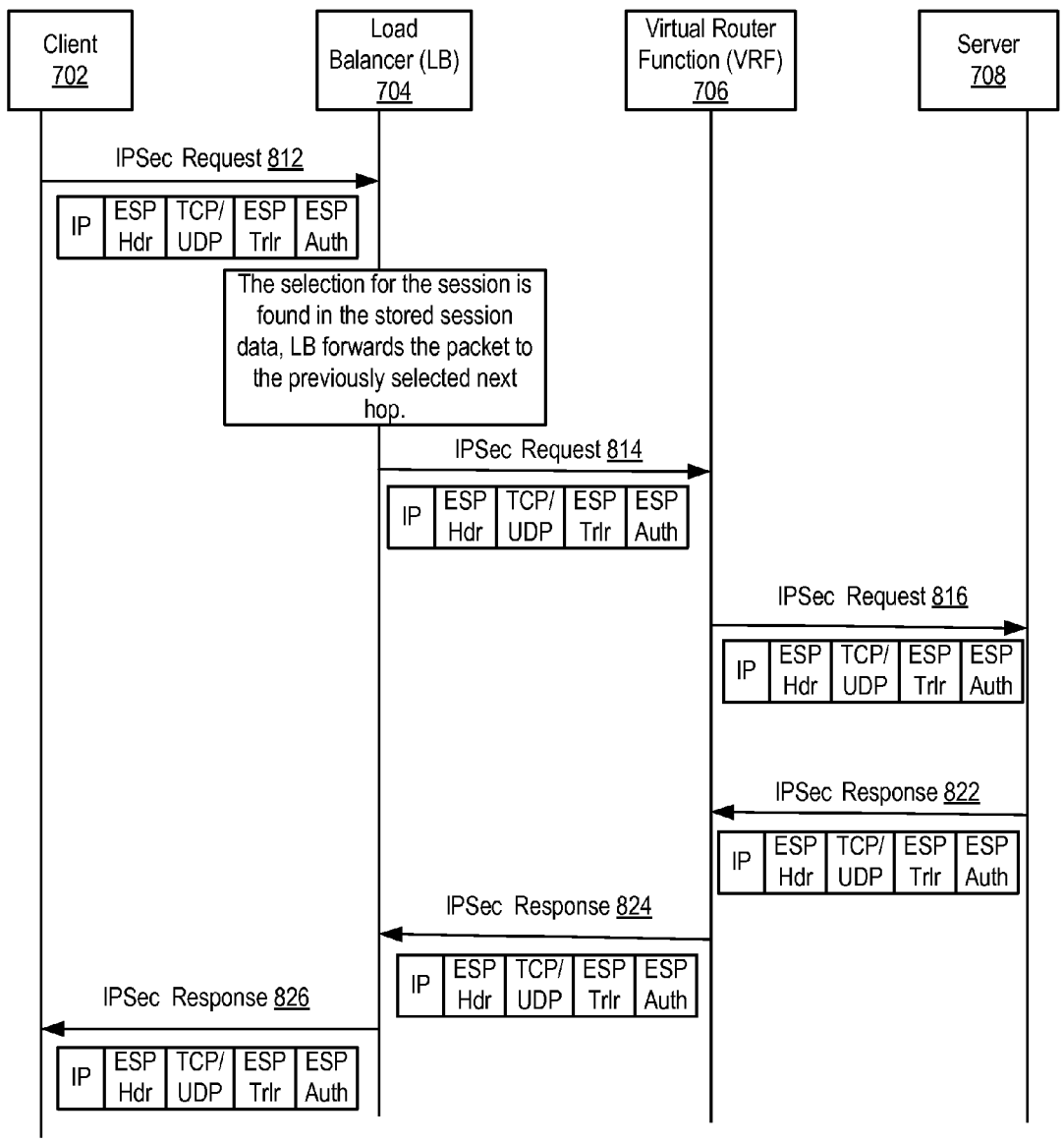
FIG. 8 is a block diagram illustrating an encrypted IPSec packet transmission through session-aware load balancing according to one embodiment of the invention.

After IPSec registration is complete, the subsequent packets of the communication session may be encrypted. FIG. 8 is a block diagram illustrating an encrypted IPSec packet transmission through session-aware load balancing according to one embodiment of the invention. The operations in FIG. 8 are continuation of operations in FIG. 7, and can only occur after the registration is complete, thus state information of the session and load balancing determination are made for the communication session.

At reference 812, a subsequent packet of the registered IPSec session is sent from client 702 to load balancer 704. The packet has the same IP header, which contains the source IP address of client 702 and destination IP address of the VIPA of load balancer 704. The layer 4 headers are encrypted with encapsulating security payload (ESP) authorization field, ESP header, and ESP trailers, the three of which are illustrated as ESP Auth, ESP Hdr, and ESP Trlr respectively.

At load balancer 704, it looks for any stored session data for the session based on the IPSec request packet. Once it finds the match in the stored session data, it forwards the packet to the previously selected next hop for the communication session. The packet is then relayed through VRF 706 and reach the selected server 708. At the selected server 708, once the packet is processed, the IPSec response packet is returned to VRF 706, which relays the packet back to client 702, similar to the operations for IPSec registration response in FIG. 7.

Throughout the process of packet forwarding, again the packet maintains the same source and destination IP addresses. Thus, the encryption of the packet is intact, and the load balancer does not need to know the payload of the packet.

SDN and NFV Environment Utilizing Embodiments of the Invention

Embodiments of the invention may be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 9A:
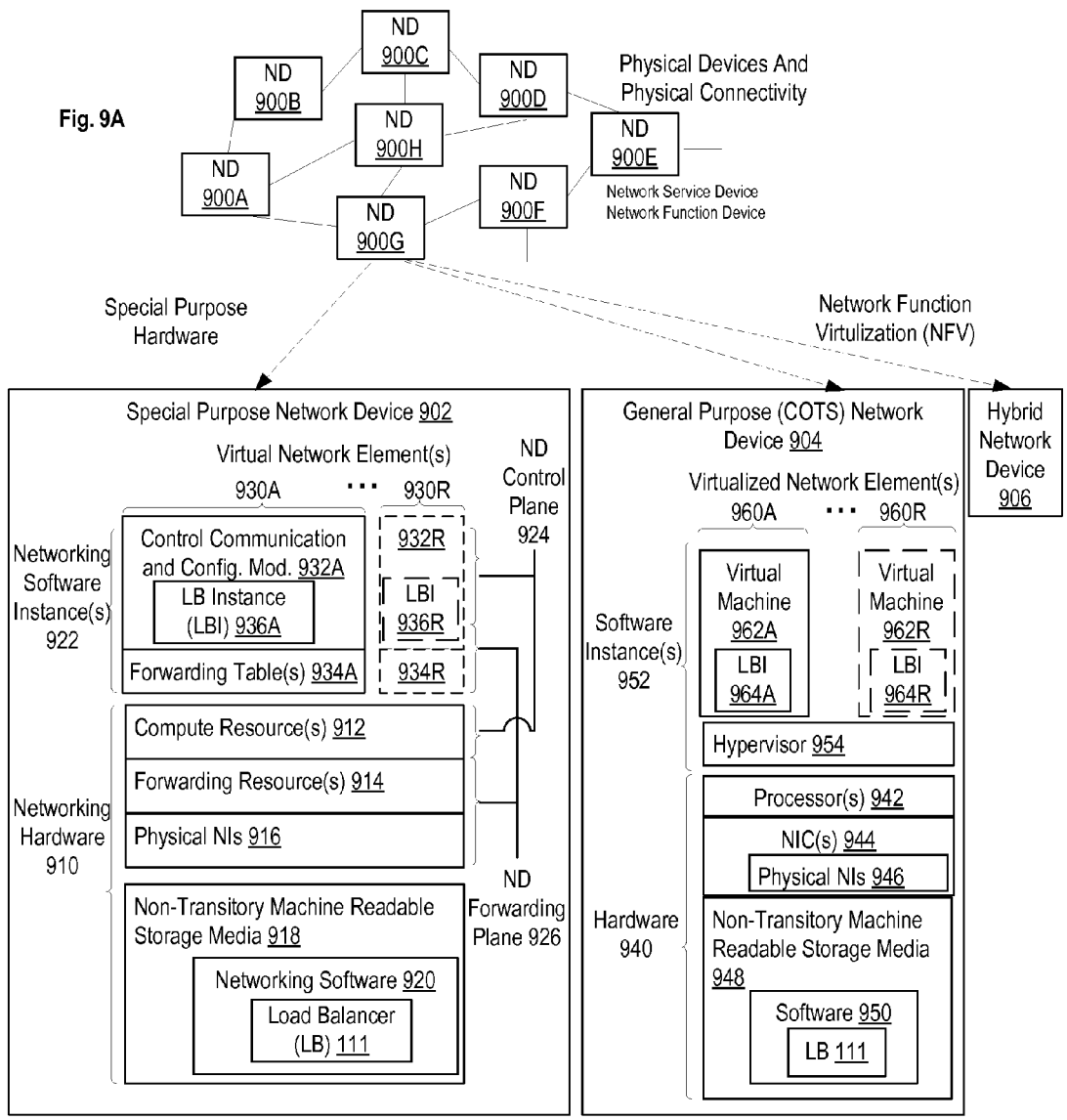
FIG. 9A illustrates connectivity between network devices (NDs) within an exemplary network, as well as three exemplary implementations of the NDs, according to some embodiments of the invention.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software, such as load balancer 111, which is a software module configured on special purpose network device 902 for load balancing as illustrated in FIGS. 1-3 and FIG. 5. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operations, the load balancer 111 may be executed by the networking hardware 910 to instantiate a set of one or more load balancer instance(s) (LBIs) 921. Each of the load balancer instance 921, and that part of the networking hardware 910 that executes that load balancer instance (be it hardware dedicated to that networking software instance and/or time slices of hardware temporally shared by that networking software instance), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

Figure 9B:
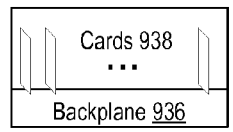
FIG. 9B illustrates an exemplary way to implement the special-purpose network device 1002 according to some embodiments of the invention.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein load balancer 111. During operation, the processor(s) 942 execute the load balancer 111 to instantiate a hypervisor 954 (sometimes referred to as a virtual machine monitor (VMM)) and one or more virtual machines 962A-R that are run by the hypervisor 954, which are collectively referred to as software instance(s) 952. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 962A-R, and that part of the hardware 940 that executes that virtual machine (be it hardware dedicated to that virtual machine and/or time slices of hardware temporally shared by that virtual machine with others of the virtual machine(s) 962A-R), forms a separate virtual network element(s) 960A-R.

The virtual network element(s) 960A-R perform similar functionality to the virtual network element(s) 930A-R. The load balancer instances 964A and 964R are instantiated in virtual machines 962A to 962R. The hypervisor 954 may present a virtual operating platform that appears like networking hardware 910 to virtual machine 962A, and the virtual machine 962A may be used to implement functionality similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 962A-R differently. For example, while embodiments of the invention are illustrated with each virtual machine 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 954 includes a virtual switch that provides similar forwarding services as a physical Ethernet switch. Specifically, this virtual switch forwards traffic between virtual machines and the NIC(s) 944, as well as optionally between the virtual machines 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 9C:
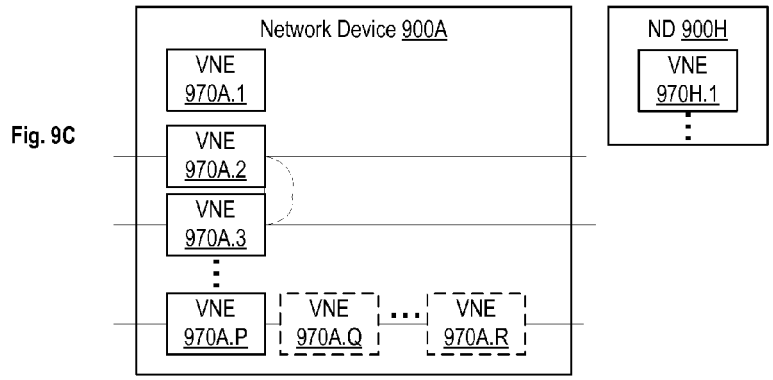
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the virtual machines 962A-R may operate as servers; the same would be true for the hybrid network device 906; in the case of the special-purpose network device 902, one or more such servers could also be run on a hypervisor executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 10D illustrates a network with a single network element on each of the NDs of FIG. 10A. Specifically, FIG. 10D illustrates network elements (NEs) 1070A-H with the same connectivity as the NDs 1000A-H of FIG. 10A with a centralized approach for maintaining reachability and forwarding information (also called network control), according to some embodiments of the invention.

Figure 9D:
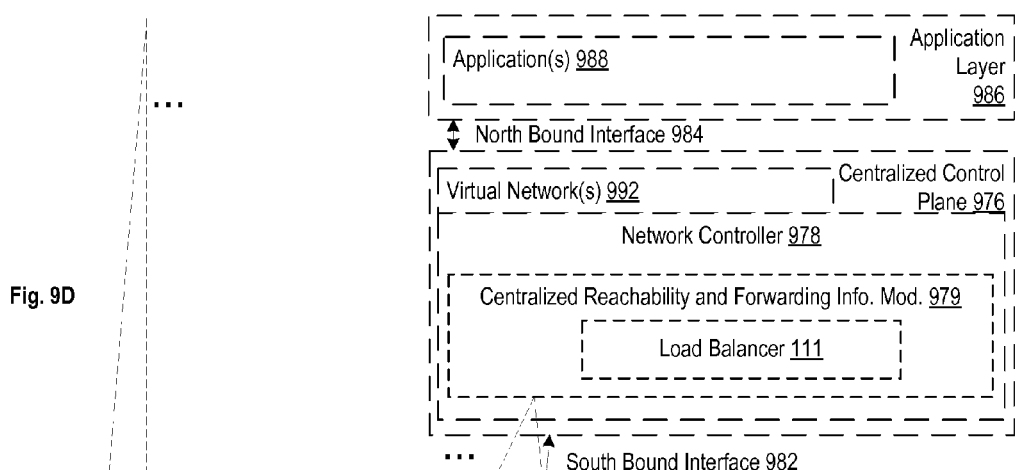
FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-A with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 970A-H (e.g., the compute resource(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). The centralized reachability and forwarding information module 979 contains load balancer 111 as illustrated in FIG. 1.

The network intelligence is centralized in the centralized control plane 976 executing on electronic devices that are typically separate from the NDs. For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
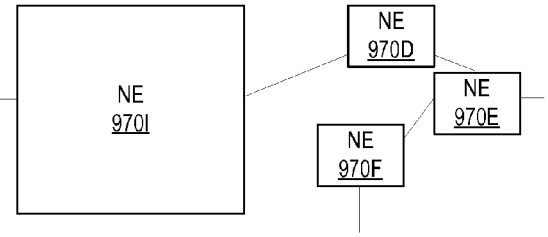
FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention.
Figure 9F:
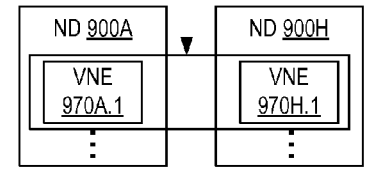
FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
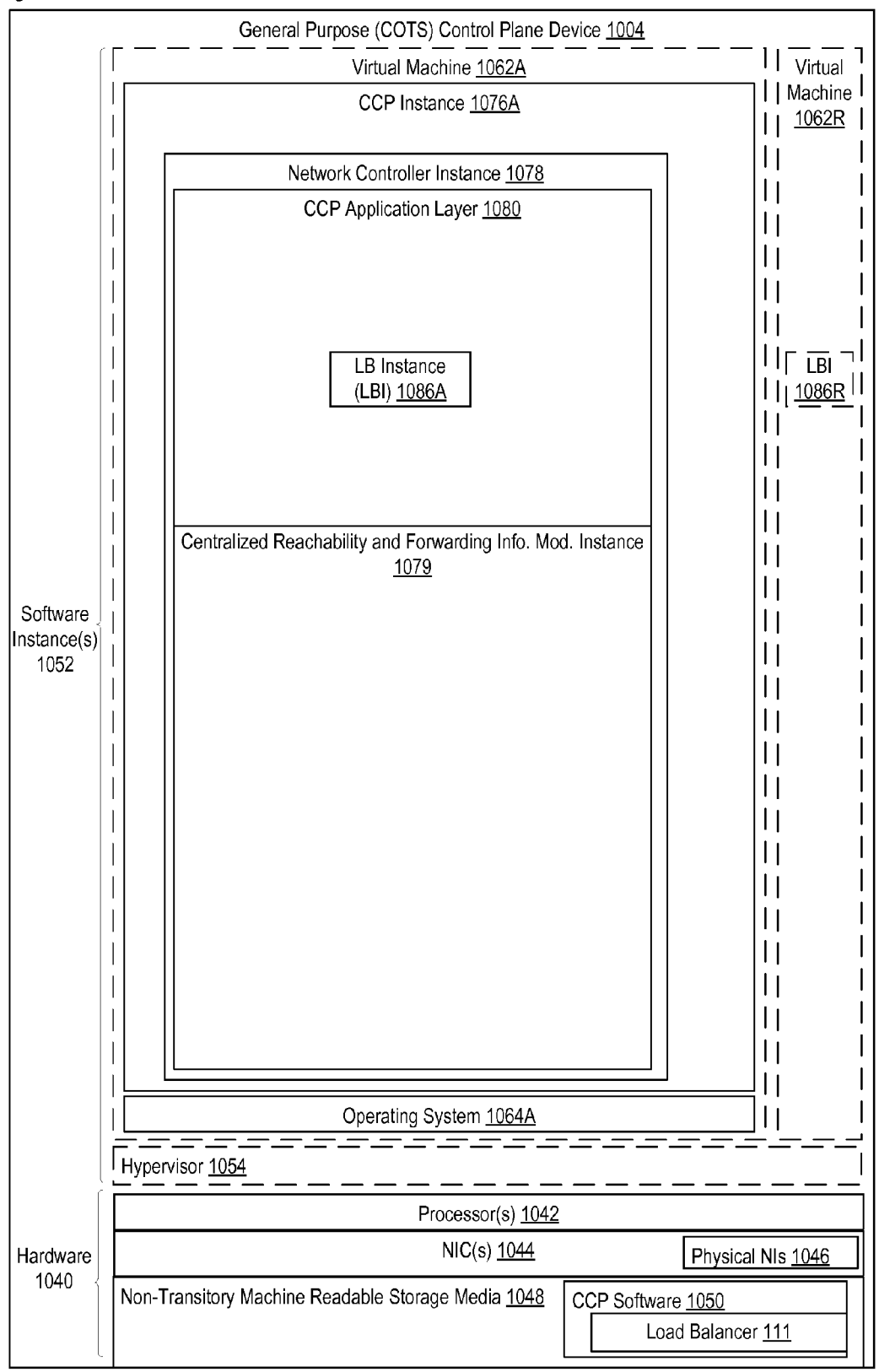
FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050, according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050. CCP software 1050 contains load balancer 111 as illustrated in FIG. 1.

In embodiments that use compute virtualization, the processor(s) 1042 typically execute software to instantiate a hypervisor 1054 (sometimes referred to as a virtual machine monitor (VMM)) and one or more virtual machines 1062A-R that are run by the hypervisor 1054; which are collectively referred to as software instance(s) 1052. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 1050 (illustrated as CCP instance 1076A) on top of an operating system 1064A are typically executed within the virtual machine 1062A. In embodiments where compute virtualization is not used, the CCP instance 1076A on top of operating system 1064A is executed on the "bare metal" general purpose control plane device 1004.

The operating system 1064A provides basic processing, input/output (I/O), and networking capabilities. In some embodiments, the CCP instance 1076A includes a network controller instance 1078. The network controller instance 1078 includes a centralized reachability and forwarding information module instance 1079 (which is a middleware layer providing the context of the network controller 1078 to the operating system 1064A and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view. CCP application layer 1080 contains traffic load balancer instance 1086A which is an instance of load balancer 111.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1080, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The operations of the flow diagrams FIGS. 4 and 6 are described with reference to the exemplary embodiment of FIGS. 1-3, 5, 9 and 10. However, it should be understood that the operations of flow diagrams can be performed by embodiments of the invention other than those discussed with reference to the exemplary embodiment of FIGS. 1-3, 5, 9 and 10, and the exemplary embodiment of FIGS. 1-3, 5, 9 and 10 can perform operations different than those discussed with reference to the flow diagrams of FIGS. 4 and 6.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network device serving as a load balancing network device coupled to a network containing a load balancing system, wherein the load balancing system contains the network device and a plurality of servers, the method comprising:
    assigning a virtual Internet Protocol address (VIPA) to the network device;
    assigning the VIPA also to the plurality of servers;
    disabling destination address translation and port translation by the network device;
    assigning a plurality of next hop IP addresses in the network device, wherein each next hop IP address corresponds to an IP interface to one of the plurality of servers;
    advertising the VIPA of the network device to network elements outside of the load balancing system;
    receiving a packet with a destination IP address corresponds to the VIPA assigned to the network device and the plurality of servers;
    determining that the packet with a source IP address is a first packet in a communication session;
    selecting one of the set of next hop IP addresses to forward the packet to reach a server of the plurality of servers based on a load balancing policy in response to the determination that the packet with the source IP address is the first packet in the communication session;
    forwarding the packet based on the selected next hop IP address; and
    saving the selection of the network device for forwarding subsequent packets of the communication session.

2. The method of claim 1, wherein the selection of the network device is saved in a forwarding table coupled to the network device.

3. The method of claim 2, further comprising:
    receiving a subsequent packet of the communication session;
    identifying the selected next hop IP address from the forwarding table; and
    forwarding the subsequent packet to the selected next hop IP address.

4. The method of claim 2, further comprising:
    removing the selection of the network device from the forwarding table once the communication session is terminated.

5. The method of claim 1, further comprising:
    determining that the server operates in an abnormal state, wherein the server saves state information of the communication session to a database external to the server, and wherein the database is accessible to other servers of the plurality of servers;
    selecting one of the set of next hop IP addresses to forward the subsequent packets of the communication session to reach another server of the plurality of servers based on the load balancing policy; and
    saving the selection of the network device for forwarding the subsequent packets to reach the another server with the destination IP address.

6. The method of claim 5, wherein the determination of the server operating in the abnormal state is through monitoring the server at the network device.

7. The method of claim 1, wherein the packet forwarding to the one of the plurality of servers passes a network element performing virtual routing and forwarding function, wherein the network element contains one or more interfaces coupled to the network device, and a plurality of interfaces each coupled to one of the plurality of servers.

8. The method of claim 1, wherein the network device is a software-defined networking (SDN) controller.

9. The method of claim 1, wherein the packet complies with one of protocol suites:
    Internet Protocol Security (IPSec);
    Diameter;
    Session Initiation Protocol (SIP);
    H.248; and
    Transport Layer Security.

10. A network device coupled to a load balancing system, wherein the network device is to balance load of the load balancing system and is coupled to a plurality of servers, the network device comprising:
    a processor; and
    a non-transitory machine-readable storage media coupled to the processor and storing load balancing software, which when executed by the processor, causes the processor to:
        assign a virtual Internet Protocol address (VIPA) to the network device,
        assign the VIPA also to the plurality of servers,
        disable destination address translation and port translation by the network device,
        assign a plurality of next hop IP addresses in the network device, wherein each next hop IP address corresponds to an IP interface to one of the plurality of servers,
        advertise the VIPA of the network device to network elements outside of the load balancing system, receive a packet with a destination IP address corresponds to the VIPA to the network device and the plurality of servers, determine that the packet with a source IP address is a first packet in a communication session, select one of the set of next hop IP addresses to forward the packet to reach a server of the plurality of servers based on a load balancing policy in response to the determination that the packet with the source IP address is the first packet in the communication session, forward the packet based on the selected next hop IP address, and save the selection of the network device for forwarding subsequent packets of the communication session.

11. The network device of claim 10, where the selection of the network device is to be saved in a forwarding table coupled to the network device.

12. The network device of claim 11, wherein the processor is further to:

receive a subsequent packet of the communication session;

identify the selected next hop IP address from the forwarding table; and forward the subsequent packet to the selected next hop IP address.

13. The network device of claim 10, wherein the processor is further to:

determine that the server operates in an abnormal state, wherein the server saves state information of the communication session to a database external to the server, wherein the database is accessible to other servers of the plurality of servers;

select one of the set of next hop IP addresses to forward the subsequent packets of the communication session to reach another server of the plurality of servers based on the load balancing policy;

save the selection of the network device for forwarding the subsequent packets to reach the another server with the destination IP address.

14. The network device of claim 13, wherein the determination of the server operating in the abnormal state is through the processor to monitor the server.

15. The network device of claim 10, wherein the network device is a software-defined networking (SDN) controller.

16. A non-transitory machine-readable medium having instructions stored therein, which when executed by a processor, cause the processor to perform operations at a network device coupled to a load balancing system, wherein the network device is to balance load of the load balancing system and is coupled to a plurality of servers, the operations comprising:

assigning a virtual Internet Protocol address (VIPA) to the network device;

assigning the VIPA also to the plurality of servers;

disabling destination address translation and port translation by the network device;

assigning a plurality of next hop IP addresses in the network device, wherein each next hop IP address corresponds to an IP interface to one of the plurality of servers;

advertising the VIPA of the network device to network elements outside of the load balancing system;

receiving a packet with a destination IP address corresponds to the VIPA assigned to the network device and the plurality of servers;

determining that the packet with a source IP address is a first packet in a communication session;

selecting, one of the set of next hop IP addresses to forward the packet to reach a server of the plurality of servers based on a load balancing policy in response to the determination that the packet with the source IP address is the first packet in the communication session;

forwarding the packet based on the selected next hop IP address; and saving the selection of the network device for forwarding subsequent packets of the communication session.

17. The non-transitory machine-readable medium of claim 16, wherein the selection of the network device is saved in a forwarding table coupled to the network device.

18. The non-transitory machine-readable medium of claim 17, wherein the operations further comprise:

receiving a subsequent packet of the communication session;

identifying the selected next hop IP address from the forwarding table; and forwarding the subsequent packet to the selected next hop IP address.

19. The non-transitory machine-readable medium of claim 16, wherein the operations further comprise:

determining that the server operates in an abnormal state, wherein the server saves state information of the communication session to a database external to the server, and wherein the database is accessible to other servers of the plurality of servers;

selecting one of the set of next hop IP addresses to forward the subsequent packets of the communication session to reach another server of the plurality of servers based on the load balancing policy;

saving the selection of the network device for forwarding the subsequent packets to reach the another server with the destination IP address.

20. The non-transitory machine-readable medium of claim 19, wherein the determination of the server operating in the abnormal state is through the processor monitoring the server.

* * * * *